1,446,639

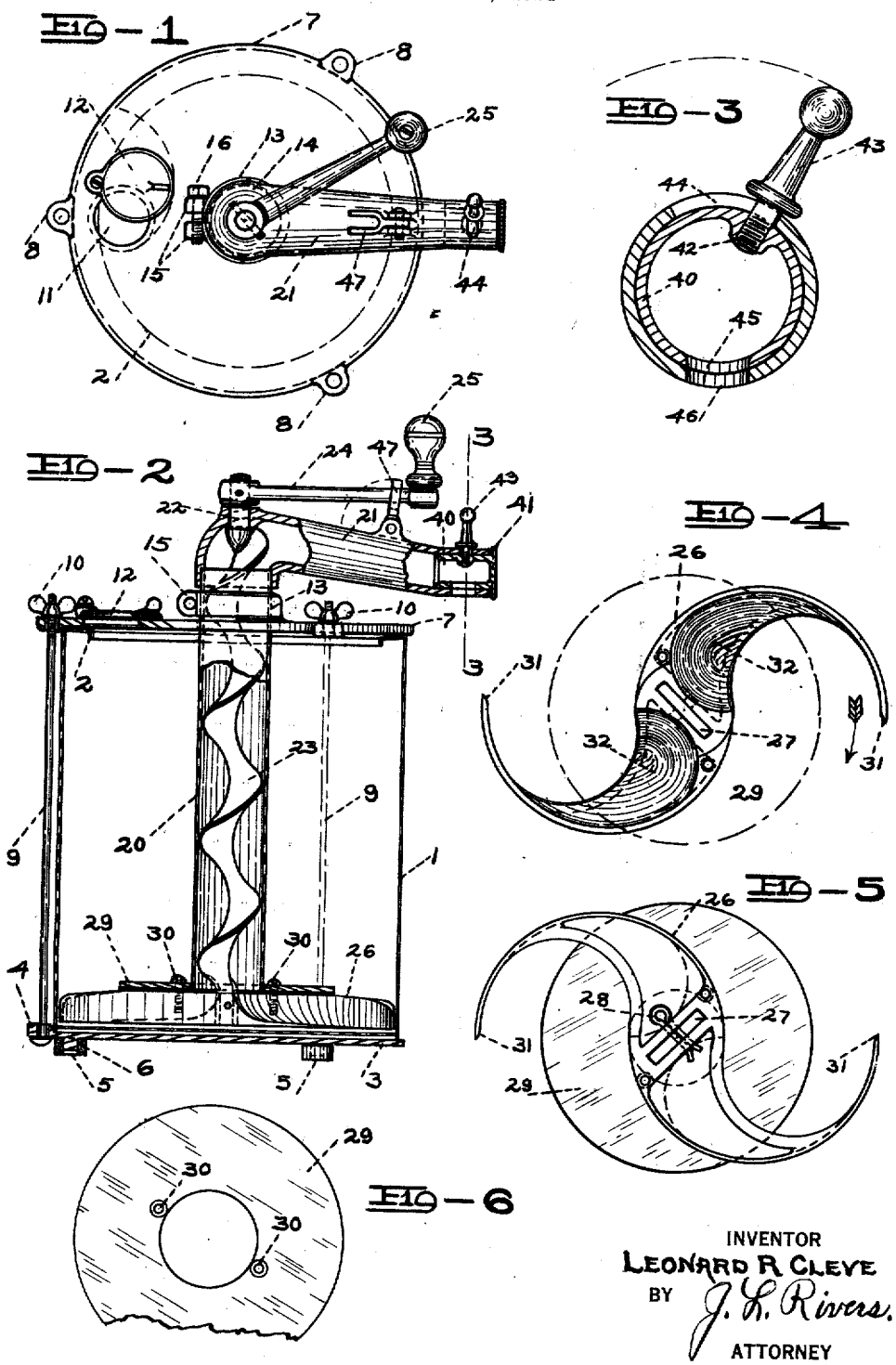
Feb. 27, 1923.
L. R. CLEVE
DISTRIBUTOR FOR PEANUT BUTTER
Filed Nov. 19, 1921
1,446,639
INVENTOR
LEONARD R CLEVE
BY J. L. Rivers
ATTORNEY Patented Feb. 27, 1923.

UNITED STATES PATENT OFFICE.

LEONARD R. CLEVE, OF SEATTLE, WASHINGTON.

DISTRIBUTOR FOR PEANUT BUTTER.

Application filed November 19, 1921. Serial No. 516,501.

*To all whom it may concern:*

Be it known that I, LEONARD R. CLEVE, a citizen of the United States, residing at Seattle, in the county of King and State of Washington, have invented a new and useful Distributor for Peanut Butter, of which the following is a specification.

My invention has reference particularly to improvements in machines for distributing peanut butter in quantities required for retail purposes.

This commodity is usually packed by the producer in cylindrical containers, and retailed in various ways, many of which are insanitary, inconvenient, and render a proper blending of the peanut butter difficult, if not impossible.

The objects of my invention are, to eliminate these objections, and with said purposes in view I provide a special top for the container to replace its original one, carrying mechanism adapted to be inserted into the container and whereby the peanut butter can be thoroughly blended, and removed in quantities desired through a spout at the upper portion of the container. A rotary blade of special design is included, cooperating with a circular plate, which forces the butter properly blended, to a screw, manually rotatable, by which the butter is raised to and through said spout. The blade operates in a way to remove practically all of the material from the container, and the contents remain protected at all times, subject only to the slight exposure necessarily incident to applying the device, or inspecting or dispensing the same.

In the accompanying drawings—

Figure 1 is a top plan view of the device.

Fig. 2 shows a vertical section of the same as mounted in operative position to a peanut butter container.

Fig. 3 is an enlarged view, in cross section, of the discharge spout, drawn on the line 3—3, of Fig. 2.

Fig. 4 is a top plan view, enlarged, of a rotary blade which is instrumental in blending and forcing the peanut butter to the lifting screw, the location of a circular plate cooperating therewith being indicated by dotted lines.

Fig. 5 illustrates the lower side of said blade, enlarged, showing the slot and the cotter pin connection therewith for holding the lower end of the lifting screw to the blade, also said circular plate as mounted on the top portion of the blade.

Fig. 6 is a view of said plate disconnected from the blade, and partly broken away.

Referring more particularly to the drawings, 1 denotes, in this embodiment of the invention, a cylindrical container such as is commonly used for packing peanut butter, and 2 indicates that portion of its top which has been removed. The container, as shown in Fig. 2, is seated on a base 3, preferably a casting, which is provided with three laterally extending and integral lugs 4, each having an opening to receive a bolt. One of said lugs is illustrated in Fig. 2. The base also carries a plurality of integral downwardly extending lugs 5, circular in cross section, on which ferrules of rubber tubing 6 are placed, slightly longer than the lugs, to serve as feet.

The top of the device 7, as illustrated in Fig. 1, is a plate circular in form, provided with three laterally extending lugs 8 and having openings adapted to align with the openings in the three similar lugs extending from the sides of the base. For the purpose of holding the top to the container and the container on the base, bolts 9 connect said lugs, and are held in place by the winged nuts 10. 11 denotes an opening in the top for observing the interior of the container and its contents, and 12 a cover therefor. A collar 13, integral with the top, surrounds a circular opening 14 through the top, its major portion being in alignment therewith, and both located centrally of the top. Said collar is cut away from the top on either side, and carries the ears 15 15, connected by the bolt 16, threaded therein, to form a clamp.

A cylindrical casing 20, is shown in Fig. 2. as located within the container to its extreme length. It is adapted to rotate within the collar 13, if desired, for a purpose to be hereinafter set forth, but its normal position is that shown in Fig. 2, and fixedly held in place by said clamp. It carries at its upper portion a spout denoted by 21.

Journaled in the head of the spout section, as indicated at 22, is a screw 23, extending through and operable within said casing. At its upper terminal and exteriorly of the container, it is provided with a crank 24 and a handle 25, obviously for rotating the same. Its lower terminal is equipped with a rectangular section adapted to be keyed to an S shaped blade 26, through the slot 27, and held in place by the cotter pin 28, Fig. 5. The lower portion of said cylindrical casing carries a circular plate 29, having an axial opening of a diameter sufficient to snugly admit the casing. Said plate is attached to the blade by the screws 30 30. Under this construction, the screw rotates within the casing, the plate rotates around the free and open end thereof as an axis, and the blade attached to said screw and plate rotates therewith.

The blade, preferably of a length slightly less than the inside diameter of the container, is provided with curved ends beveled inwardly and extending, when in operative position, approximately parallel with the sides of the container, adapted to perform a scraping function against the inner periphery thereof. These ends are of a height sufficient to also move the peanut butter toward the concave sections of the blade 32 32 into which the ends gradually merge as indicated in Fig. 4. The concave sections move the material in contact therewith toward the lower and open portion of the cylindrical casing and under the plate 29. As the blade rotates, the plate offers a resistance to the material moved by the blade, and its effect, cooperating with the blade, is to force said material through the opening in the plate and into the casing, where it is taken up by the screw and carried out of the container through the casing and the spout.

The discharge spout, as shown in detail by a broken off section in Fig. 2 and the cross-section, Fig. 3, is provided at its free end with a cap 40, rotatable therein, and having an exterior flanged portion 41. A threaded section 42 is adapted to receive the handle 43, which operates in the slot 44 in the spout. A movement of the handle to one extreme limit will cause an opening 45 in the member to align with an opening 46 in the spout, through which peanut butter is dispensed from the container into any convenient receptacle. A reverse movement of the handle, as is evident, will close said opening.

47 denotes a U shaped support pivoted to the top of the spout, for holding the crank and handle in a fixed position, as shown in Fig. 2. In Fig. 1 the support is shown, as disconnected from the crank. In addition to the functions already ascribed to the blade, when the crank is held by this support, and the collar 13 loosened from the casing 20, the blade, casing and connections may be raised within the container and used to agitate and blend the material therein. This is accomplished by using the spout as a handle and manually rotating the blade and casing, as well as moving the same longitudinally in the container, the support holding the blade against rotation and permitting it to function as a paddle throughout the container.

In utilizing the device, a container of peanut butter is placed upon the base, and the top of the container removed. Preferably, the screw casing and its connections should be raised approximately to their extreme upper limit in relation to the top. This is effected, as heretofore indicated, by having the collar 13 loosened so as to permit free movement of the casing therein. The top is then applied to the container and fastened to the base by the bolts and winged nuts through the lugs described; the top, container and base being thus securely held together. The screw being held against rotation within the casing by the support for the crank, the casing and its lower connections are then forced down through the material; at the same time a rotary movement is imparted to it manually to blend the peanut butter, and also to place the blade and connections in operative position at the bottom of the container.

When so placed, the device is ready for distribution, by clamping the casing to the top, by the collar 13 and its connections, and disconnecting the support from the crank. A rotation of the screw, by the means described, will dispense the peanut butter from the container and through the spout, in quantities desired.

While the force of gravity contributes to the success of this device in keeping a supply of peanut butter at the bottom of the container, as long as it lasts, the instrumentalities described provide positive means for gathering and forcing the material in contact with the screw, and the screw itself, when rotated, obviously lifts and carries said material out of the container, up through the casing and forcing it out through the spout. When the greater portion of the peanut butter has been thus removed from the container, the blade, as heretofore set forth, can be raised or lowered within the container and utilized for scraping its interior and saving any of the material that might adhere to the sides thereof.

I claim:

1. A device of the class described, comprising an open cylindrical container, a base, a top, means connecting the top and base for detachably securing the container therebetween, a cylindrical casing rotatably mounted in the top, its open and lower end adapted to extend within the container and adjacent the bottom thereof, a clamp to hold the casing against rotation, a spout connected with the upper end of the casing, a conveyor screw extending through the casing, its upper terminal journaled in the head of the spout, its lower terminal keyed to a rotary S shaped blade, a plate, having an axial opening, rotatably mounted on the lower end of the casing and fixedly attached to the blade, means for rotating the screw, and means for holding the same against rotation.

2. A device of the class described, comprising a cylindrical container having an axial opening in its top, a cylindrical casing rotatable therein, its lower and open end extending to adjacent the bottom of the container, a clamp to hold the casing against rotation, a spout carried by the casing, a conveyor screw extending through the casing, its upper terminal journaled in the spout, a blade, for blending and carrying plastic material to the screw, fixedly attached to the lower terminal of the screw, a plate, having an axial opening, rotatably mounted on the lower end of the casing and fixedly attached to the blade, means for rotating the screw and means for holding the same against rotation.

3. In a device of the class described having a container, a cylindrical casing rotatable therein and extending adjacent to the bottom thereof, a spout carried by the casing, a conveyor screw extending through the casing and adapted to rotate therein, its upper portion communicating with the spout, a blade for blending and carrying said material to the screw, fixedly attached to the lower portion of the screw and rotatable therewith, a plate, having an axial opening, rotatably mounted on the lower end of the casing and fixedly attached to the blade, means for rotating the screw, and a clamp for holding the casing in a fixed position within the container.

4. In a device of the class described, a cylindrical casing having a laterally extending spout at its upper end, a conveyor screw, its upper terminal journaled in the spout, the body of the screw extending to the lower open end of the casing, a blade fixedly attached to its lower terminal, a plate, having an axial opening, rotatably connected with the lower end of the casing and fixedly attached to the upper portion of said blade, and means for rotating the screw.

5. In a distributor for peanut butter, the combination of a rotary blade provided with reversely curved ends adapted to move peanut butter toward a widened and concave section in the upper portion of said blade into which each end is gradually merged, said sections terminating in reversed curved relation in the medial portion of the blade, and a thin circular plate, fixedly attached to said portion, having an axial opening communicating with each concave section, and through which said material is adapted to pass from said sections.

6. In a distributor for peanut butter, a container, a screw conveyor, a blade fixedly attached to the lower terminal of the screw and adapted to rotate in the bottom of the container, including a plate-like member located above the blade adapted to offer resistance to and collect material gathered by the blade, and cooperating with the blade, to direct said material to the screw.

LEONARD R. CLEVE.